United States Patent Office 3,382,272
Patented May 7, 1968

---

3,382,272
FATTY AMINES AS COLOR STABILIZERS
FOR DIALKYL PHTHALATES
Clarence E. Tholstrup and Alan Bell, Kingsport, Tenn.,
assignors to Eastman Kodak Company, Rochester, N.Y.,
a corporation of New Jersey
No Drawing. Filed Feb. 1, 1965, Ser. No. 429,606
5 Claims. (Cl. 260—475)

ABSTRACT OF THE DISCLOSURE

A color-stable composition comprising a dialkyl ester of a phthalic acid containing a color stabilizing amount of a fatty amine having the formula $$R^1{}_xNH_{(3-x)}$$

wherein $x$ is an integer of 1 or 2 and $R'$ is an aliphatic group containing from 12–24 carbon atoms.

---

This invention relates to the color stabilization of dialkyl phthalates which are normally subject to discoloration due to the influence of heat, oxygen, metals and/or aging. More particularly, this invention relates to the use of fatty amines to stabilize dimethyl terephthalate and other dialkyl phthalates against discoloration.

The use of phthalic acid diesters as plasticizers for resinous compositions and as starting materials in the preparation of polyester resins is well known in the art. However, one objection to such compounds is that they tend to become discolored under certain conditions, such as when subjected to the influence of heat, oxygen, metals and/or aging.

It is an object of this invention to provide an effective color stabilizer for dialkyl phthalates such as dimethyl terephthalate.

It is another object of this invention to provide a dialkyl phthalate composition containing an amine stabilizer which is effective at levels as low as 1 to 5 parts per million.

It is a further object of this invention to provide a dialkyl phthalate composition which will not become discolored when subjected to the influence of heat, oxygen, metals and/or aging.

These, and other objects, are attained by the practice of this invention which, briefly, comprises providing a composition comprising a dialkyl ester of a phthalic acid having the formula

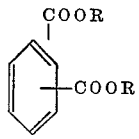

wherein each R is an alkyl group containing from 1 to 6 carbon atoms, said composition containing a color stabilizing amount of a fatty amine having the formula $R^1{}_xNH_{(3-x)}$ wherein $x$ is a whole integer having a value of from 1 to 2 and $R^1$ is an aliphatic group containing from 12 to 24 carbon atoms. This composition is characterized by being stable against discoloration when subjected to the influence of heat, oxygen, metals and aging.

The dialkyl esters of phthalic acid which may be color stabilized in accordance with the practice of this invention include the lower (alkyl) esters of the ortho, meta and para isomers of phthalic acid. Such compounds include dimethyl phthalate, dibutyl phthalate, dimethyl isophthalate, diethyl isophthalate, di-n-butyl isophthalate, dimethyl terephthalate, diethyl terephthalate, di-n-propyl terephthalate, di-n-butyl terephthalate, etc.

The amines which may be used to stabilize the dialkyl phthalates according to this invention are primary or secondary fatty amines (i.e., $R^1NH_2$ or $R^1{}_2NH$) in which the aliphatic $R^1$ group or groups such as straight or branch chain contain from 12 to 24 carbon atoms. Such compounds are well known and are commercially available under a variety of trade names. These products contain either predominantly one aliphatic chain length or mixtures of several aliphatic chain lengths. Some examples of such commercially available primary and secondary fatty amines include Primene 81-R (a primary fatty amine having a boiling point of from 221 to 238° C. and a neutral equivalent of 191 in which the aliphatic group comprises a mixture of t-alkyl isomers having from 12 to14 carbon atoms); Primene JMT (a primary fatty amine having a boiling range of from 265 to 305° C. and a neutral equivalent of 330 in which the aliphatic group comprises a mixture of t-alkyl isomers having from 18 to 22 carbon atoms); Alamine 205 (ditetradecyl amine having a melting point of 52° C.); and Alamine 207 (dioctadecyl amine having a melting point of 70° C.).

The fatty amine may be used in an amount as low as 1 part per million to stabilize the dialkyl phthalates although it is preferred to use it in an amount of at least 5 parts per million. It is also preferred that the fatty amine be used in an amount less than about 200 parts per million since higher concentrations tend to accelerate rather than retard color formation.

The fatty amine may be added to and mixed with the dialkyl phthalates in any convenient manner. Since the fatty amine is used in such small amounts as compared to the amount of dialkyl phthalate, it is generally advantageous to add it in the form of a dilute stock solution of the fatty amine in order to avoid working with minute quantities of the fatty amine.

The color stabilized dialkyl phthalate compositions may be used in the manner well known in the art for utilizing dialkyl phthalates. That is, they may be used as plasticizers or in condensation reactions with glycols in the preparation of linear polyesters such as polyethylene terephthalate.

The following examples illustrate the best modes contemplated for carrying out this invention:

EXAMPLES 1 TO 8

In these examples, a series of the fatty amines listed in Table 1 were tested as color stabilizers for dimethyl-terephthalate. Solutions containing 0.01 g. of each amine in 50 ml. of acetone were first prepared. A quantity of each solution was pipetted into a 10 in. tube having a diameter of ⅝-inch containing 20 g. of unstabilized dimethyl terephthalate in an amount sufficient to provide the concentration of the amine indicated in Table 1. (One ml. of the stock solution imparts 10 p.p.m. of the amine to the 20 g. sample of dimethyl terephthalate.) The tube was then placed in an electrically heated aluminum block which was preheated to a temperature of 165° C. and aged. At intervals during the aging, the dimethyl terephthalate samples were matched with a set of APHA color standards. The time required for a sample to reach an APHA color rating of 25, 50 and/or 75 is recorded in Table 1. The results of the tests set forth in Table 1 indicate that dimethyl terephthalate containing 10, 20 and 50 p.p.m. of a fatty amine are considerably more resistant to discoloration by heat than is dimethyl terephthalate which contains no fatty amine; and that the use of 200 p.p.m. of fatty amine accelerates rather than retards the heat discoloration of dimethyl terephthalate.

TABLE 1

| Example | Amine | Concentration, p.p.m. | Initial APHA Color | Stability at 165° C. | | |
|---|---|---|---|---|---|---|
| | | | | Hr. to APHA of 25 | Hr. to APHA of 50 | Hr. to APHA of 75 |
| 1 | None | | 10 | 30 | 45 | 60 |
| 2 | Primene 81-R | 20 | 10 | | 138 | |
| 3 | do | 50 | 10 | | 113 | |
| 4 | Primene JMT | 10 | 10 | 45 | | |
| 5 | do | 20 | 10 | 40 | 170 | |
| 6 | Alamine 205 | 20 | 10 | 40 | 324 | |
| 7 | do | 10 | 10 | 66 | 170 | |
| 8 | Primene 81-R | 200 | 10 | 1 | 1 | 15 |

EXAMPLES 9 TO 13

These examples illustrate the use of fatty amine stabilized dimethyl terephthalate to prepare prepolymers of poly (1,4-dimethylenecyclohexylene terephthalate). By the process described in the preceding examples, there were added the amounts of the amines listed in Table 2 to portions of dimethyl terephthalate and these portions were aged at 165° C. for the times indicated in Table 2. The APHA color of the dimethyl terephthalate after aging at 165° C. for the indicated time is set forth in Table 2. Each of the portions of dimethyl terephthalate (1.94 g.; 0.01 mole) was admixed with 1,4-cyclohexanedimethanol (2.88 g.; 0.014 mole) and 1 drop of MgTi catalyst. This mixture was heated with a strip of stainless steel in a glass test tube equipped with a distillation head and a nitrogen inlet tube at 200° C. for 15 minutes and then at 310° C. for 20 minutes. A high vacuum was then applied to the system and heating was continued at 310° C. under a pressure of 0.08 mm. of Hg for 10 minutes. The color of the melt of the resultant prepolymers was observed immediately after heating was discontinued using APHA color standards. A color rating of from 1 to 8 was assigned to each polymer. The relationship of the color rating to the APHA color of the melt is as follows.

Melt color (APHA): Color rating of prepolymer
- 0–25 _____ 1
- 25–37.5 _____ 2
- 37.5–50 _____ 3
- 50–75 _____ 4–5
- 75–100 _____ 6–7
- 100–150 _____ 7–8

The color rating of the prepolymer obtained in each example is indicated in Table 2. The prepolymers had inherent viscosities of about 0.25 as measured in a 60% phenol–40% tetrachloroethane solution.

TABLE 2

| Example | Amine | Concentration, p.p.m. | Hrs. Dimethyl Terephthalate Aged at 156° C. | APHA Color of Dimethyl Terephthalate after Aging | Prepolymer Color Rating |
|---|---|---|---|---|---|
| 9 | None | | 50 | 50 | 8 |
| 10 | Alamine 205 | 10 | 635 | 60 | 1 |
| 11 | do | 20 | 467 | 60 | 1 |
| 12 | Primene 81-R | 20 | 138 | 50 | 1 |
| 13 | Primene JWT | 20 | 170 | 50 | 1 |

Other alkyl esters of phthalic acid, isophthalic acid and terephthalic acid may be stabilized with fatty primary and secondary amines employing the procedures set forth in the preceding examples and in the more general description set forth hereinabove.

We claim:
1. A composition comprising a dialkyl ester of a phthalic acid having the formula

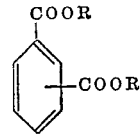

wherein each R is an alkyl group containing from 1 to 6 carbon atoms, said composition containing a color stabilizing amount of a fatty amine having the formula $R^1_x NH_{(3-x)}$ wherein $x$ is a whole integer having a value of from 1 to 2 and $R^1$ is a straight or branch chain alkyl containing from 12 to 24 carbon atoms, said composition being characterized by being stable against discoloration when subjected to the influence of heat, oxygen, metals and aging.

2. A composition as defined in claim 1 wherein said fatty amine is a primary amine having the formula $R^1 NH_2$.

3. A composition as defined in claim 1 wherein said fatty amine is a secondary amine having the formula $R^1_2 NH$.

4. A composition as defined in claim 1 wherein said fatty amine is present in said composition in an amount of from 10 to 50 parts per million.

5. A composition as defined in claim 1 wherein said dialkyl ester of a phthalic acid is dimethyl terephthalate.

References Cited

Rose et al.: Condensed Chem. Dictionary, Reinhold, New York, N.Y., 1956, 6th ed., p. 22.

LORRAINE A. WEINBERGER, *Primary Examiner.*

T. L. GALLOWAY, *Assistant Examiner.*